US012440418B2

(12) United States Patent
Liu et al.

(10) Patent No.: US 12,440,418 B2
(45) Date of Patent: Oct. 14, 2025

(54) NEGATIVE PRESSURE MASSAGE APPARATUS FOR MEN AND MASSAGE STRUCTURE THEREOF

(71) Applicants: BIBOTING INTERNATIONAL CO., LTD., Taoyuan (TW); Po-Chang Liu, Taoyuan (TW)

(72) Inventors: Po-Chang Liu, Taoyuan (TW); Li-Pin Yuan, Taoyuan (TW)

(73) Assignees: BIBOTING INTERNATIONAL CO., LTD., Taoyuan (TW); Po-Chang Liu, Taoyuan (TW)

( * ) Notice: Subject to any disclaimer, the term of this patent is extended or adjusted under 35 U.S.C. 154(b) by 873 days.

(21) Appl. No.: 17/676,778

(22) Filed: Feb. 21, 2022

(65) Prior Publication Data

US 2023/0263698 A1 Aug. 24, 2023

(51) Int. Cl.
*A61H 9/00* (2006.01)
*A61H 23/02* (2006.01)

(52) U.S. Cl.
CPC ........... *A61H 9/0057* (2013.01); *A61H 23/02* (2013.01); *A61H 2009/0064* (2013.01); *A61H 2201/1207* (2013.01)

(58) Field of Classification Search
CPC .......... A61H 9/0057; A61H 2009/0064; A61H 9/00; A61H 9/005; A61H 19/30;
(Continued)

(56) References Cited

U.S. PATENT DOCUMENTS

2015/0196454 A1* 7/2015 Levy ...................... A61H 19/32 600/38
2016/0317380 A1 11/2016 Gutierrez Villanueva
(Continued)

FOREIGN PATENT DOCUMENTS

CN 2268503 Y * 11/1997
CN 2305990 Y 2/1999
(Continued)

OTHER PUBLICATIONS

"JP_2008136776_A" contains the translated document with paragraph numbers. (Year: 2025).*
(Continued)

*Primary Examiner* — Justine R Yu
*Assistant Examiner* — Thomas Z Chang
(74) *Attorney, Agent, or Firm* — Chun-Ming Shih; HDLS IPR SERVICES

(57) ABSTRACT

A negative pressure massage apparatus for men and a massage structure thereof are provided. The massage structure includes a cup and a mounting ring. The cup includes a cavity. An opening end and a sealed end are formed at two ends of the cup respectively. The opening end includes a cup edge formed thereon, and the sealed end includes a connecting hole communicating to the cavity. The mounting ring includes a ring member and a receiving seat extended from the ring member. The ring member is mounted on the cup edge, and the receiving seat is inserted in the cavity. Accordingly, massage for the male reproductive organ may be provided in conjunction with acupuncture point massage for its surrounding area at the same time.

9 Claims, 7 Drawing Sheets

(58) Field of Classification Search
CPC .. A61H 19/32; A61H 19/34; A61H 2205/087; A61H 23/02–0263; A61H 2023/0209–029; A61H 39/007; A61M 1/08
See application file for complete search history.

(56) References Cited

U.S. PATENT DOCUMENTS

| | | | | |
|---|---|---|---|---|
| 2019/0167513 | A1 | 6/2019 | Topolev | |
| 2020/0163826 | A1* | 5/2020 | Topolev | A61H 23/0218 |
| 2020/0390948 | A1* | 12/2020 | Liu | A61H 9/0057 |
| 2021/0212886 | A1 | 7/2021 | Burnett-Jones | |

FOREIGN PATENT DOCUMENTS

| | | | | | |
|---|---|---|---|---|---|
| CN | 210933007 | U | | 7/2020 | |
| CN | 111789753 | A | * | 10/2020 | A61H 23/02 |
| CN | 113208892 | A | * | 8/2021 | A61F 5/41 |
| JP | 2008136776 | A | * | 6/2008 | |
| KR | 20070020988 | A | * | 2/2007 | |
| WO | WO-2008043240 | A1 | * | 4/2008 | A61H 19/44 |

OTHER PUBLICATIONS

"Nanosilver. Beyond_Pesticides" is a download of the webpage retrieved via the WayBack Machine from Apr. 10, 2021. (Year: 2025).*

* cited by examiner

NEGATIVE PRESSURE MASSAGE APPARATUS FOR MEN AND MASSAGE STRUCTURE THEREOF

BACKGROUND OF THE DISCLOSURE

Technical Field

The technical field of the present disclosure relates to a massage apparatus, and in particular, to a negative pressure massage apparatus for men and a massage structure thereof.

Description of Related Art

The main body difference between men and women relies on the unique sexual characteristics of the two. That is, their different sexual organs. Men have the sexual organs of penis and scrotum, etc., and women have uterus and vagina, etc. In other words, since the two have obvious difference in their sexual organs, venereal diseases associated with the two are also different.

For men, the most common venereal diseases are related to the organs of penis, scrotum and prostate, and the main symptoms of such diseases include impotence, premature ejaculation, urinary incontinence, and urinary problems caused by Benign prostatic hyperplasia. Regarding such venereal diseases for men, patients often feel shame and fail to seek medical attention timely, such that the most optimal timing for medical treatment may be missed. Furthermore, for those patients that are willing to seek medical treatment, physicians tend to only issue prescription according to the description provided by the patients for drug administration. However, during the medical treatment via drug administration, since drugs are intended to provide relief to the symptoms of the patients only, fast treatment effect may not be achieved. Consequently, the efficacy of medical treatment via drug administration may be lower than the expected outcome.

In view of the above, the inventor seeks to overcome the aforementioned drawbacks associated with the known terminal block and aims to provide an effective solution through extensive researches along with utilization of academic principles and knowledge.

SUMMARY OF THE DISCLOSURE

An objective of the resent disclosure is to provide a negative massage apparatus for men and a massage structure thereof, capable of providing massage for the reproductive organ and also providing acupuncture point massage at surrounding body parts of the reproductive organ at the same time.

To achieve the aforementioned objective, the present disclosure provides a negative pressure massage apparatus for men, having a massage structure for men, a negative pressure device and a connecting tube. The massage structure for men includes a cup and a mounting ring. The cup includes a cavity, an opening end and a sealed end formed at two ends of the cup respectively. The opening end includes a cup edge formed thereon, and the sealed end includes a connecting hole communicating to the cavity. The mounting ring includes a ring member and a receiving seat extended from the ring member. The ring member is mounted on the cup edge, and the receiving seat is inserted in the cavity. The negative pressure device includes a negative pressure suction hole, and two ends of the connecting tube are connected to the connecting hole of the cup and the negative pressure suction hole respectively.

To achieve the aforementioned objective, the present disclosure provides a massage structure for men, having a cup and a mounting ring. The cup having a cavity, an opening end and a sealed end formed at two ends of the cup respectively. The opening end having a cup edge formed thereon, and the sealed end having a connecting hole communicating to the cavity. The mounting ring having a ring member and a receiving seat extended from the ring member. The ring member mounted on the cup edge, and the receiving seat inserted in the cavity.

The present disclosure may achieve the following technical effects. With the arrangement of the secondary receiving seat, it may allow the user to make selection according to one's own use needs and sensation preference. With the arrangement of the vibration generator, during the negative pressure massage process, the acupuncture point massage may be performed through the operation of the vibration generator, thereby achieving relatively greater physiotherapy effect. The apparatus may be used in the home, and users may avoid inconvenience and possible unpleasant feeling of embarrassment due to seeking medical treatment at hospitals. Accordingly, the present disclosure provides great convenience to users. In addition, it also has the merits of compact size, portability, and small space of occupation.

DETAILED DESCRIPTION

Figure 1:
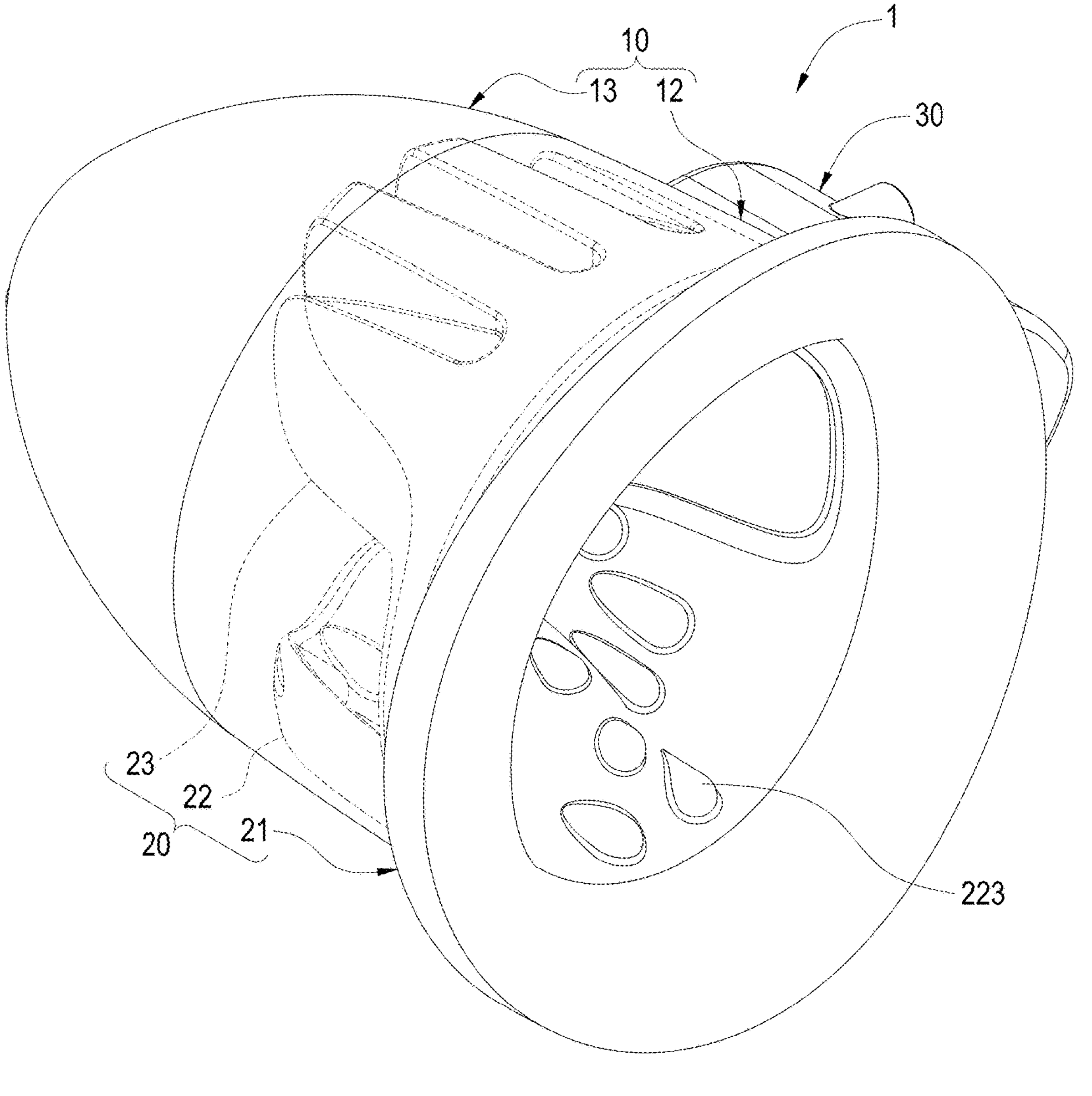
FIG. 1 is an assembly view of the massage structure for men of the present disclosure.
Figure 2:
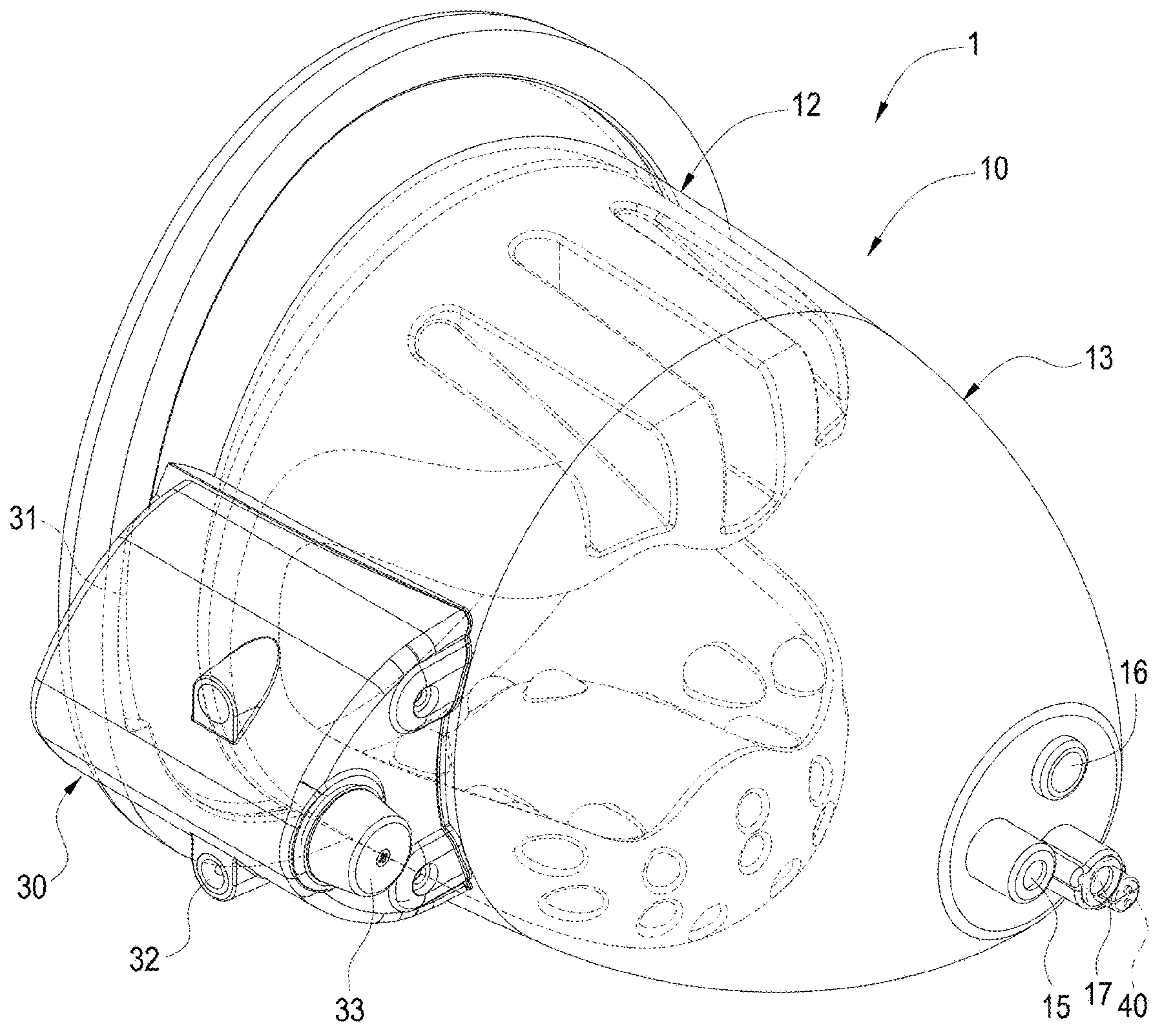
FIG. 2 is another assembly view of the massage structure for men of the present disclosure viewed from another direction.
Figure 3:
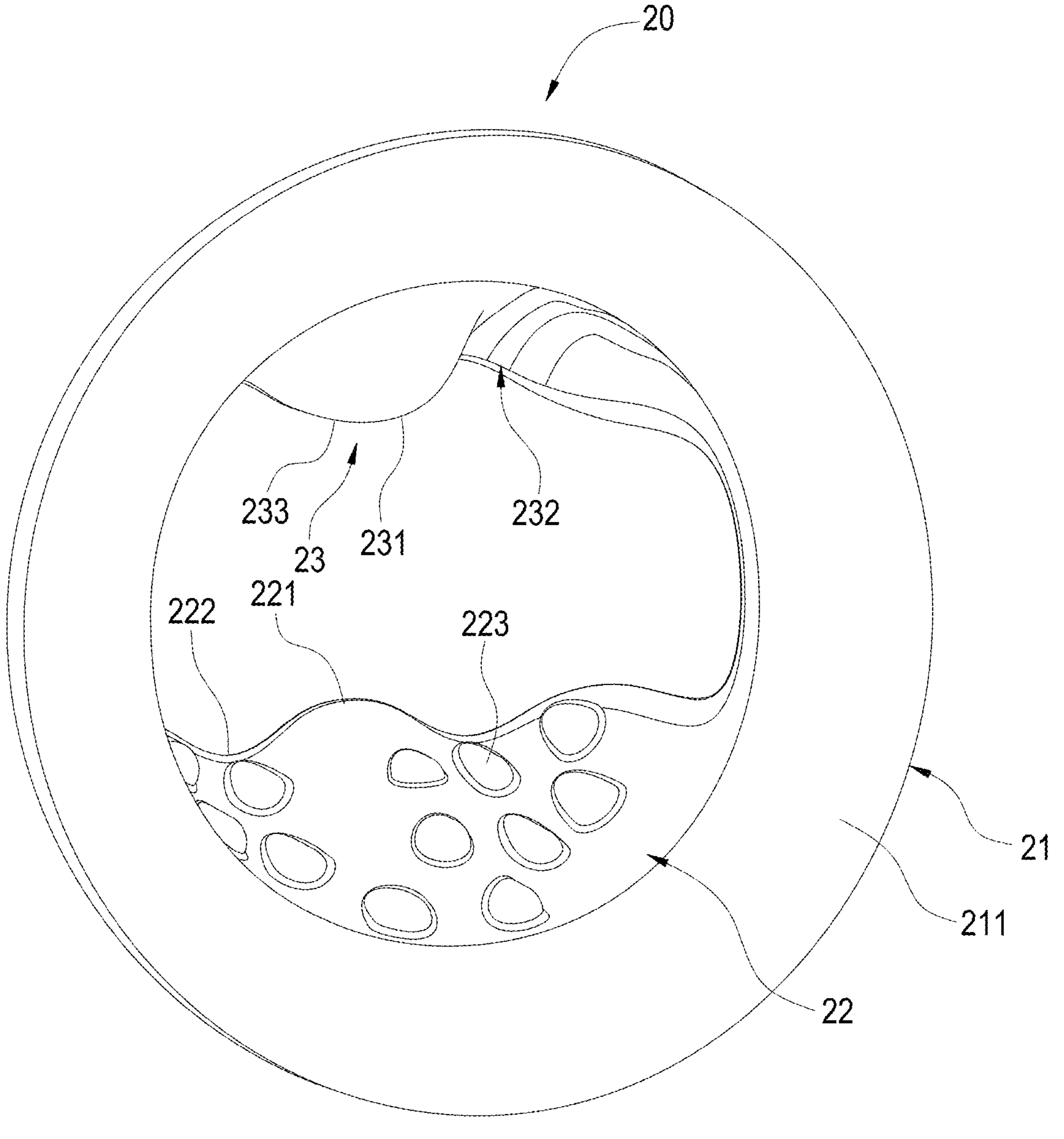
FIG. 3 is front view of the mounting ring of the present disclosure.
Figure 4:
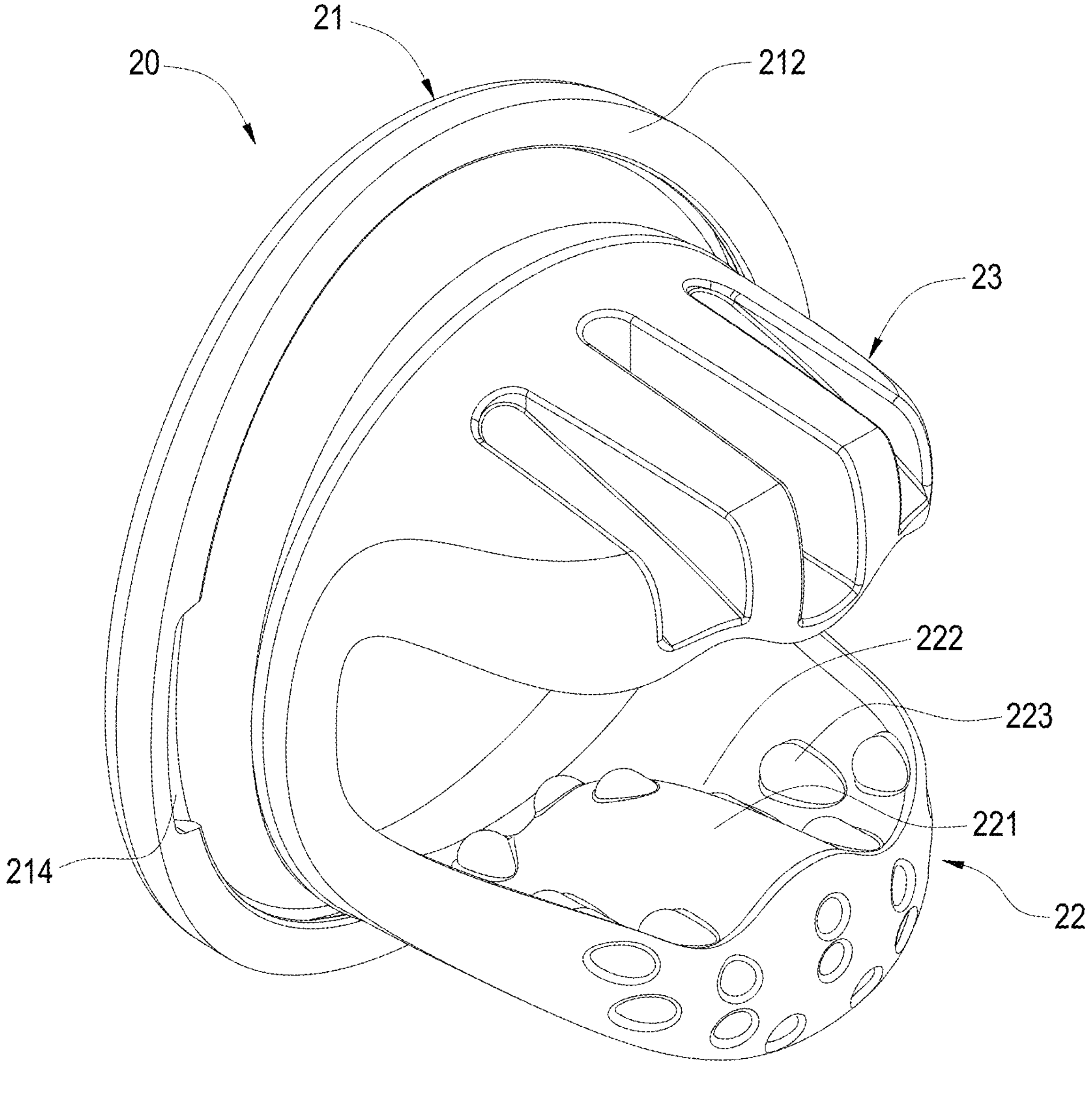
FIG. 4 is a perspective view of the present disclosure.
Figure 5:
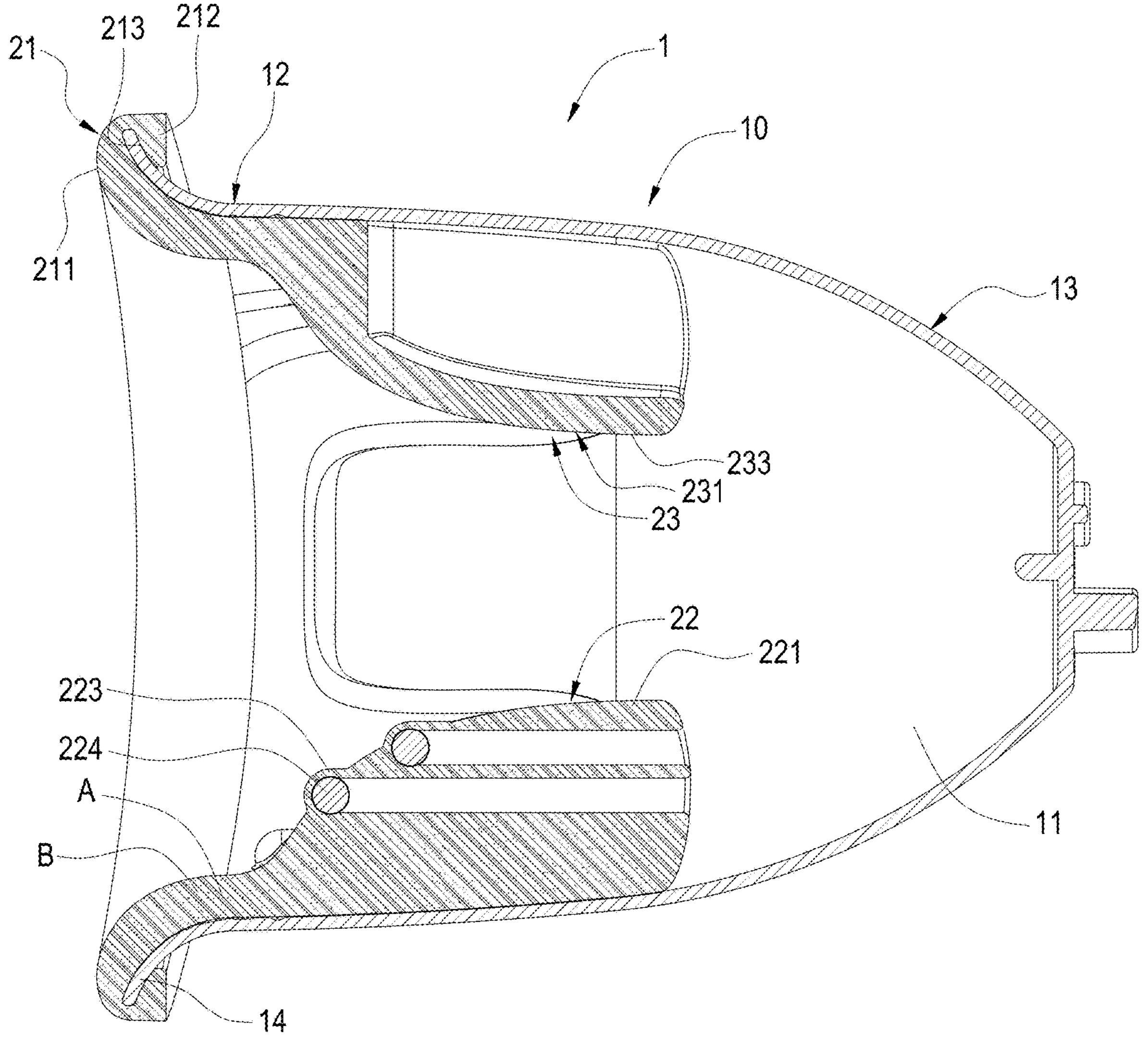
FIG. 5 is a cross sectional view of the massage structure for men of the present disclosure.

The technical contents of the present disclosure will become apparent with the detailed description of embodiments accompanied with the illustration of related drawings as follows. It is intended that the embodiments and drawings disclosed herein are to be considered illustrative rather than restrictive.

Please refer to FIG. 1 to FIG. 5. The present disclosure provides a massage structure 1 for men, the massage structure 1 mainly includes a cup 10 and a mounting ring 20.

The cup 10 may be an element made of a metal material, a plastic material or a glass material, and the present disclosure is not limited to such material only. It generally has a cone shape. The internal of the cup 10 has a cavity 11 inside. An opening end 12 and a sealed end 13 are formed at two ends of the cup 10 respectively. The opening end 12 includes a cup edge 14 formed thereon, and the sealed end 13 of the cup 10 includes a connecting hole 15 communicating with the cavity 11. In addition, the lateral side of the connecting hole 15 of the cup 10 includes a backup connecting hole 16 and a plug orifice 17 formed thereon. The plug orifice 17 communicates with the cavity 11 and is provided for a pressure relief member 40 to be installed thereon. The backup connecting hole 16 may be provided to a vibration generator or other relevant devices (not shown in the drawings) for installation securement.

The mounting ring 20 mainly includes a ring member 21 and a receiving seat 22 extended from the ring member 21. The ring member 21 is mounted on the cup edge 14, and the receiving seat 22 is inserted into the cavity 11.

In an exemplary embodiment, the ring member 21 mainly includes an inner ring 211 and an outer ring 212 folded from the inner ring 211 and forming an outer perimeter of the inner ring 211. An inner recess slot 213 is formed between the outer side of the inner ring 211 and the inner side of the outer ring 212. The cup edge 14 is inserted into and connected to the inner recess slot 213 correspondingly. The receiving seat 22 mainly includes an arched convex member 221 and two concave slots 222. The concave slots 222 are extended from the two ends of the arched convex member 221 toward a direction away from the arched convex member 221 and formed at two lateral sides of the arched convex member 221 respectively. In addition, the surfaces of the arched convex member 221 and the concave slots 222 are disposed with a plurality of massage protruding dots 223. The protruding dots 223 are arranged spaced apart from each other, and each one of the massage protruding dots 223 includes a magnet 224 embedded therein.

In an exemplary embodiment, the mounting ring 20 is an element made of a soft rubber material, and its hardness is between about 10 to about 100 HA of the Shore hardness. Accordingly, the ring member 21 of the mounting ring 20 may be firmly attached to the skin surface, thereby reducing any discomfort of the user due to pulling of the skin during the direct attachment of the cup edge 14 on the skin. In addition, when the hardness is less than 10 HA, the material of the mounting ring 20 is soft and the supporting strength is insufficient. When the hardness is greater than 100 HA, the material of the mounting ring 20 is too hard such that it may cause discomfort of the user at the contact area.

In an exemplary embodiment, the mounting ring 20 is formed by mixing a silver ion antibacterial powder A with a silicone B. To be more specific, the mounting ring 20 is formed by mixing about 0.5 wt % to about 5 wt % of silver ion antibacterial powder A with about 95 wt % to about 99 wt % of silicone B. Accordingly, the mounting ring 20 has antibacterial effect. In addition, when the silver ion antibacterial powder A is less than 0.5 wt %, the antibacterial effect may be inadequate, and when the silver ion antibacterial powder A is greater than 5 wt %, the cost may become too high.

In an exemplary embodiment, the mounting ring 20 further includes a secondary receiving seat 23 extended from the ring member 21 and arranged corresponding to the receiving seat 22. The secondary receiving seat 23 also includes an arched convex member 231 and two concave slots 232, and the shapes and structures are similar with the ones of the arched convex member 221 and the concave slots 222. The difference relies in that the surfaces of arched convex member 231 and the concave slots 232 are flat surfaces 233 to allow the user to make selection depending upon one's own use needs and sensation preference.

In an exemplary embodiment, the massage structure 1 for men of the present disclosure further includes a vibration generator 30, and one side of the outer ring 212 of the ring member 21 includes an insertion opening 214 formed thereon. The vibration generator 30 includes an insertion piece 31, and the insertion piece 31 is inserted into the insertion opening 214 correspondingly, thereby allowing the vibration generator 30 to be attached to the massage structure 1. Furthermore, the vibration generator 30 includes a first electrical connection port 32 formed at a lateral side thereof, and a rotating knob 33 for adjustment of the vibration intensity is arranged at one end of the vibration generator 30 away from the insertion piece 31.

Figure 6:
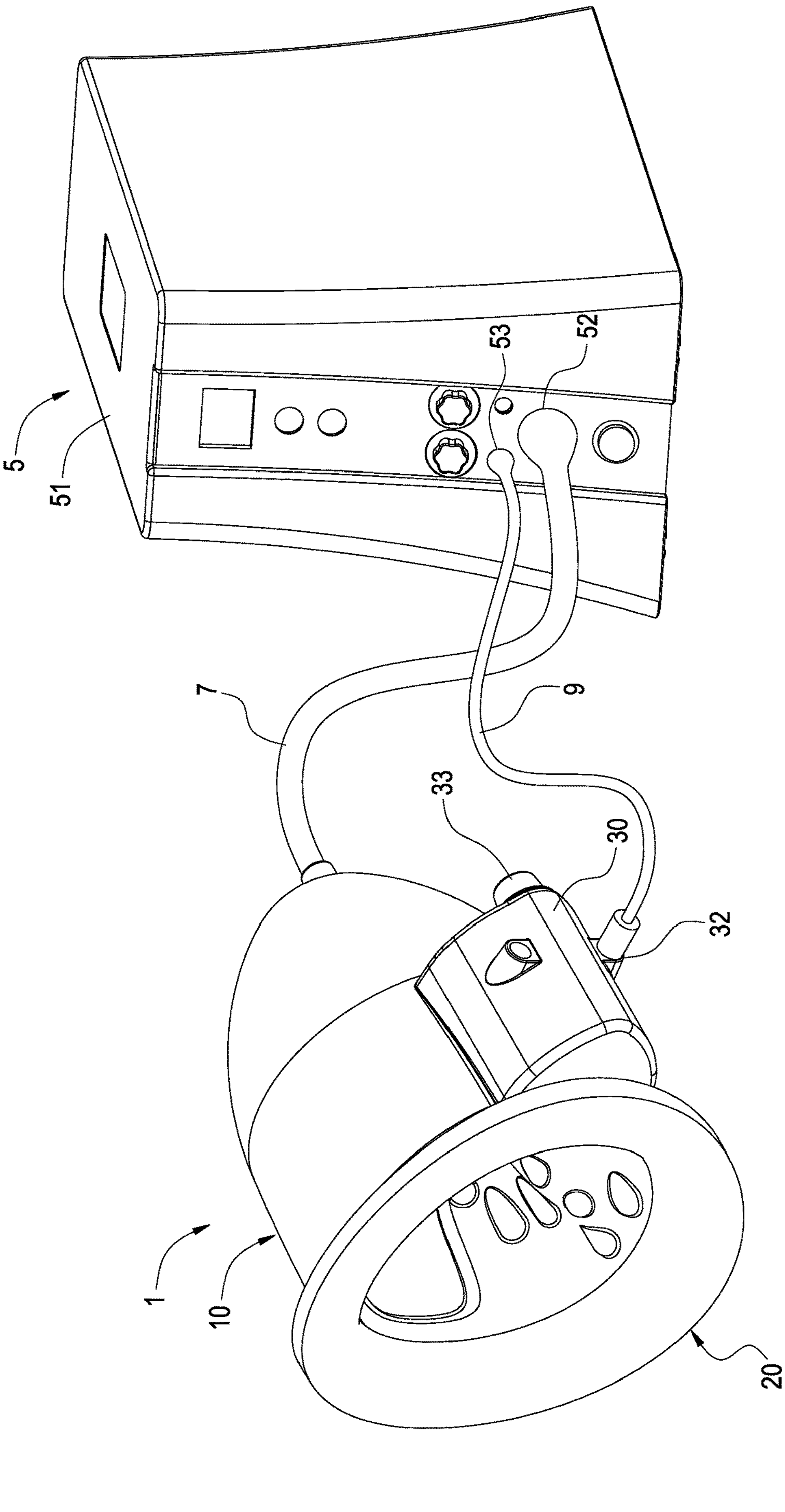
FIG. 6 is an assembly view of the negative pressure massage apparatus for men of the present disclosure.

Please refer to FIG. 6. The present disclosure further provides a negative pressure massage apparatus for men, and it mainly includes a massage structure 1 for men, a negative pressure device 5 and a connecting tube 7. The negative pressure device 5 includes a host machine 51. The host machine 51 includes the related devices such as a negative suction hole 52, a second electrical connection port 53, an adjustment knob, a display element, an indicator light, etc. The two ends of the connecting tube 7 are connected to the connecting hole 15 of the cup 10 and the negative suction hole 52 respectively. In addition, the negative pressure massage apparatus for men further includes a conductive wire 9. Two ends of the conductive wire 9 are connected to the first electrical connection port 32 and the second electrical connection port 53 respectively.

Figure 7:
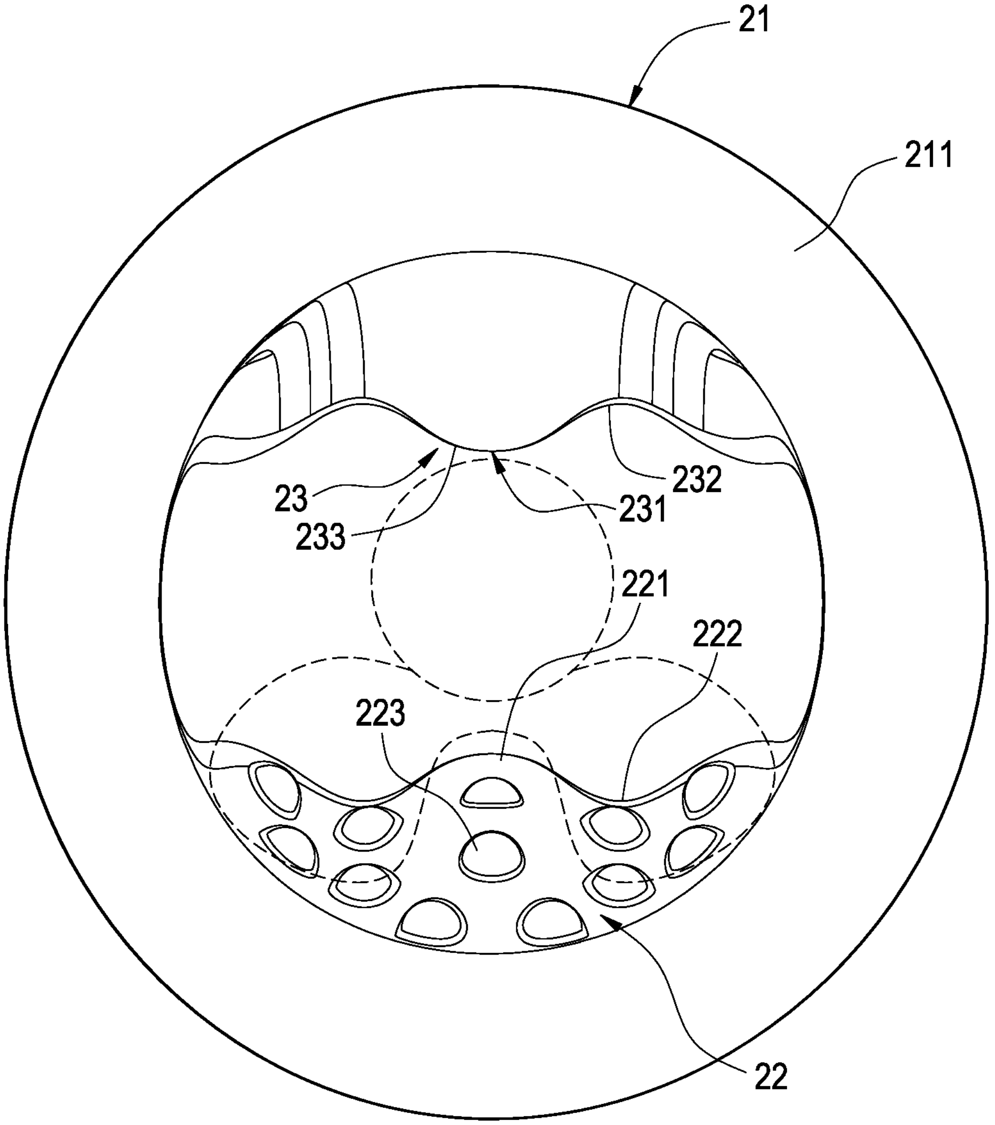
FIG. 7 is an illustration showing a state of use of the massage structure for men of the present disclosure.

Please refer to FIG. 7. The negative pressure massage apparatus for men of the present disclosure is mainly used to provide negative pressure massage at the reproductive organ area of a male user. During use, the user mounts the massage structure 1 for men on the penis, scrotum, and surrounding areas of the user. Then, the negative pressure device 5 is used to provide the negative massage or negative pressure relief alternative suction for massage. the concave slots 222 are provided for receiving the scrotum therein respectively, and the ring member 21 of the mounting ring 20 abuts against the pubic of the user. With the soft material of the mounting ring 20, the massage pressure exerted on the pubic of the user during the negative pressure massage may be reduced, thereby increasing the overall user comfort. Furthermore, through the cooperative operation of the massage protruding dots 223, the magnets 224 and the vibration generator 30, blood circulation and blood vessel dredging may be improved at the same time during the negative pressure massage.

In view of the above, the negative pressure massage apparatus for men and massage structure thereof of the present disclosure is able to achieve the expected purpose of use and to overcome known drawbacks.

What is claimed is:

1. A massage structure, comprising:

a cup, comprising a cavity, an opening end and a sealed end disposed on two ends of the cup, a cup edge disposed on the opening end, and a connecting hole defined on the sealed end communicating to the cavity;

a mounting ring, comprising a ring member, a first and a second receiving seats extended from opposite sides of the ring member, respectively, and a through opening formed between the first and the second receiving seats, the ring member mounted on the cup edge, and the first and the second receiving seats inserted in the cavity, wherein the first receiving seat comprises a first arched convex member and two first concave slots, the two first concave slots are respectively extended from two sides of the first arched convex member toward a direction away from the first arched convex member; wherein the first arched convex member and each of the two first concave slots comprise a plurality of massage protruding dots on their surfaces; wherein each one of the massage protruding dots comprises a magnet embedded therein; and a pressure relief member, the cup further comprising a plug orifice communicating with the cup, and the pressure relief member installed inside the plug orifice.

2. The massage structure according to claim 1, wherein the second receiving seat comprises a second arched convex member and two second concave slots, the two second concave slots are respectively extended from two ends of the second arched convex member toward a direction away from the second arched convex member, and a smooth surface is disposed on the second arched convex member and the two second concave slots.

3. The massage structure according to claim 1, further comprising: a vibration generator, the ring member comprising an insertion opening, the vibration generator comprising an insertion piece, and the insertion piece inserted in the insertion opening correspondingly.

4. The massage structure according to claim 1, wherein a Shore hardness of the mounting ring is between about 10 to about 100 HA.

5. The massage structure according to claim 1, wherein the mounting ring is composed of a silver ion antibacterial powder and a silicone.

6. The massage structure according to claim 5, wherein the silver ion antibacterial powder is about 0.5 wt % to about 5 wt % and the silicone is about 95 wt % to about 99.5 wt %.

7. The massage structure according to claim 1, wherein the ring member comprises an inner ring and an outer ring folded from the inner ring and disposed on an outer perimeter of the inner ring, an inner recess slot is disposed between the inner ring and the outer ring, and the cup edge is inserted in the inner recess slot correspondingly.

8. A negative pressure massage apparatus, comprising:

a massage structure, comprising a cup, a pressure relief member and a mounting ring, the cup comprising a cavity, an opening end and a sealed end disposed on two ends of the cup respectively, the opening end comprising a cup edge, and the sealed end comprising a connecting hole and a plug orifice communicating to the cavity, wherein the pressure relief member is installed inside the plug orifice; and the mounting ring comprising a ring member, a first and a second receiving seats extended from opposite sides of the ring member, respectively, and a through opening formed between the first and the second receiving seats, the ring member mounted on the cup edge, and the first and the second receiving seats inserted in the cavity, wherein the first receiving seat comprises a first arched convex member and two first concave slots, the two first concave slots are respectively extended from two sides of the first arched convex member toward a direction away from the first arched convex member: wherein the first arched convex member and each of the two first concave slots comprise a plurality of massage protruding dots on their surfaces: wherein each one of the massage protruding dots comprises a magnet embedded therein: wherein the second receiving seat comprises a second arched convex member and two second concave slots, the two second concave slots are respectively extended from two ends of the second arched convex member toward a direction away from the second arched convex member respectively, and a smooth surface is disposed on the second arched convex member and the two second concave slots;

a negative pressure device, comprising a negative pressure suction hole; and a connecting tube, comprising two ends connected to the connecting hole of the cup and the negative pressure suction hole respectively.

9. The negative pressure massage apparatus according to claim 8, further comprising: a conductive wire, a vibration generator comprising a first electrical connection port, the negative pressure device further comprising a second electrical connection port, two ends of the conductive wire electrically connected to the first electrical connection port and the second electrical connection port respectively.

* * * * *